United States Patent [19]

Tieben

[11] Patent Number: 4,887,381
[45] Date of Patent: Dec. 19, 1989

[54] ANIMAL TRAP

[76] Inventor: James B. Tieben, Rte. 1 W. Highway 56, Dodge City, Kans. 67801

[21] Appl. No.: 301,184

[22] Filed: Jan. 24, 1989

[51] Int. Cl.$^4$ ..................... A01M 23/08; A01M 23/14
[52] U.S. Cl. ...................................................... 43/66
[58] Field of Search .................. 43/66, 64, 65, 67, 61, 43/76

[56] References Cited

U.S. PATENT DOCUMENTS

| | | |
|---|---|---|
| 138,275 | 4/1873 | Owen . |
| 326,460 | 9/1885 | Tate . |
| 371,693 | 10/1887 | McKay ................................... 43/66 |
| 1,422,894 | 7/1922 | Skubinski ............................... 43/66 |
| 1,726,493 | 8/1929 | Kelley ..................................... 43/67 |
| 2,087,644 | 7/1937 | Harbison ................................ 43/76 |
| 2,787,082 | 4/1957 | Paschen ................................. 43/66 |
| 3,125,823 | 3/1964 | Smith ..................................... 43/76 |
| 4,413,439 | 11/1983 | Lindley ................................. 43/61 |
| 4,603,504 | 8/1986 | Llanos ................................... 43/76 |

Primary Examiner—Gene P. Crosby
Attorney, Agent, or Firm—Willian Branks Olds Hofer Gilson & Lione

[57] ABSTRACT

An animal trap includes a housing that defines an entry port. A pair of animal-actuated, gravity-lowered doors are mounted adjacent to the entry port such that each opens inwardly only. The inner and outer doors are coupled together to substantially prevent the inner door from opening in the inward direction when the outer door is in a closed position.

26 Claims, 3 Drawing Sheets

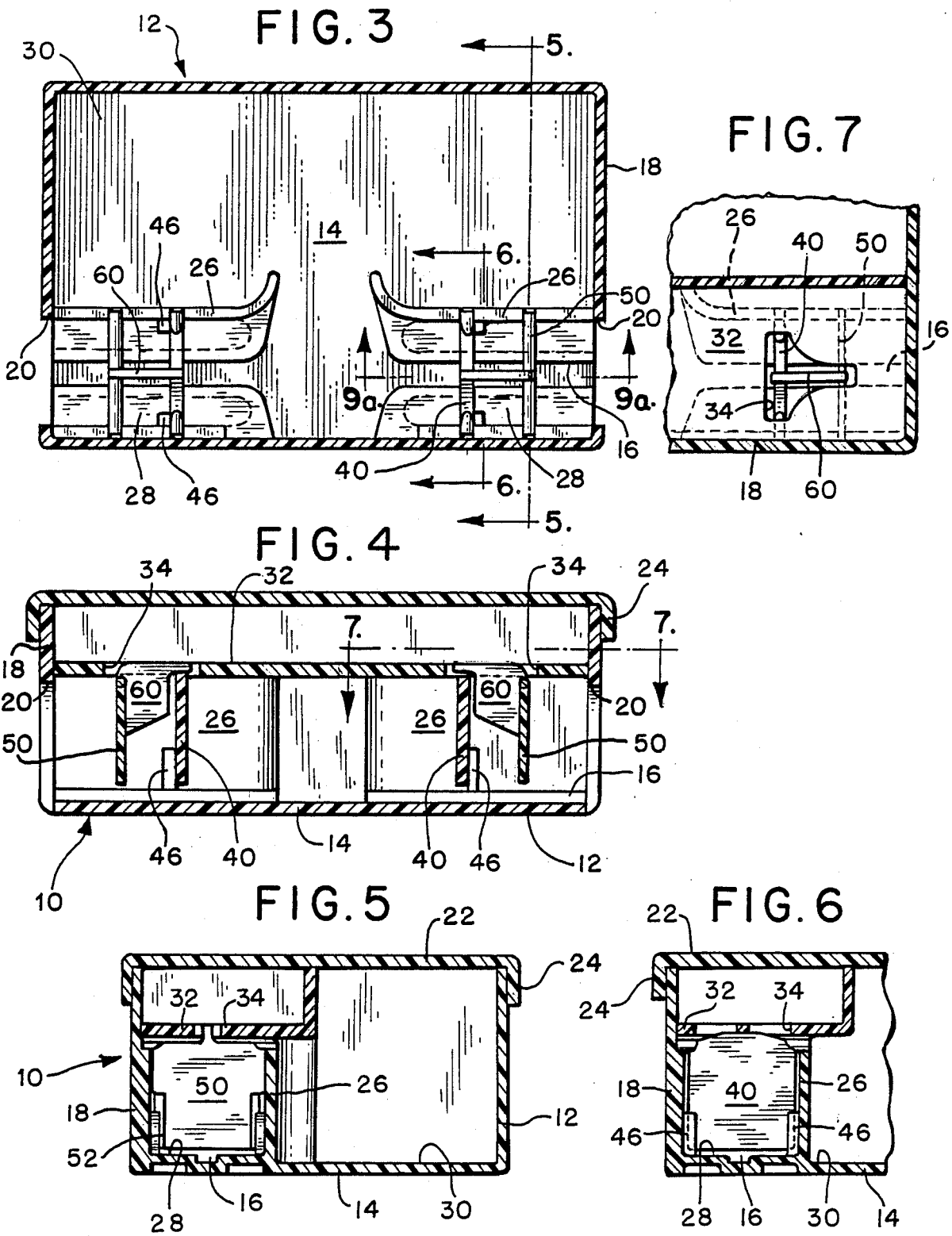

ANIMAL TRAP

BACKGROUND OF THE INVENTION

This invention relates generally to animal traps, and more specifically to animal traps suitable for use with animals such as mice.

Typically, an animal trap of the type relevant here includes an enclosure and a movable door of some type. Once the animal passes into the enclosure the door closes, preventing escape.

One type of animal trap that has been used in the past relies on a spring catch of some sort to hold the door in the closed position and to prevent the animal from opening the door and escaping. This approach brings with it the complexity of the spring mechanism and the need to reset the spring mechanism.

A simple hinged door which is prevented from opening outwardly is not effective, because such a door can be opened inwardly by an animal such as a mouse, which can scratch and claw at the edges of the door until a grip is obtained for lifting. Simple gravity operated doors have the important advantages that they are simple to manufacture and that they automatically reset once the animal has passed through the door. However, they suffer from the disadvantage described above. Perhaps for this reason they do not appear to have been used on a widespread scale commercially.

Accordingly, it is an object of this invention to provide an improved animal trap that uses animal-actuated, gravity-lowered doors, yet which substantially prevents the animal from opening the doors for escape.

It is another object of this invention to provide a simple, low cost animal trap that can be molded or otherwise formed from inexpensive plastic materials, and yet which operates reliably and effectively.

SUMMARY OF THE INVENTION

According to this invention an animal trap is provided that comprises a housing that includes a bottom, a peripheral sidewall and a top. These elements cooperate to form an imprisoning enclosure for the animal. An entry port is provided in the peripheral sidewall, and an animal-actuated, gravity-lowered inner door is hingedly mounted inwardly from the entry port for rotation about a first hinge axis between an open and a closed position. An animal-actuated, gravity-lowered outer door is hingedly mounted between the inner door and the entry port for rotation about a second hinge axis between an open and a closed position. The inner and outer doors are coupled together such that the outer door substantially prevents the inner door from opening in an inward direction when the outer door is in the closed position.

As described below, traps can be constructed in accordance with this invention which automatically reset without any action on the part of the user, yet which substantially prevent a trapped animal from opening the inner door inwardly.

The invention itself, together with further objects and attendant advantages, will best be understood by reference to the following detailed description, taken in conjunction with the accompanying drawings.

BRIEF DESCRIPTION OF THE DRAWINGS

FIG. 3 is a sectional view taken along line 3—3 of FIG. 1.

FIG. 4 is a sectional view taken along line 4—4 of FIG. 1.

FIG. 5 is a sectional view taken along line 5—5 of FIG. 3.

FIG. 6 is a sectional view taken along line 6—6 of FIG. 3.

FIG. 7 is a sectional view taken along line 7—7 of FIG. 4.

DETAILED DESCRIPTION OF THE PRESENTLY PREFERRED EMBODIMENTS

Figure 1:
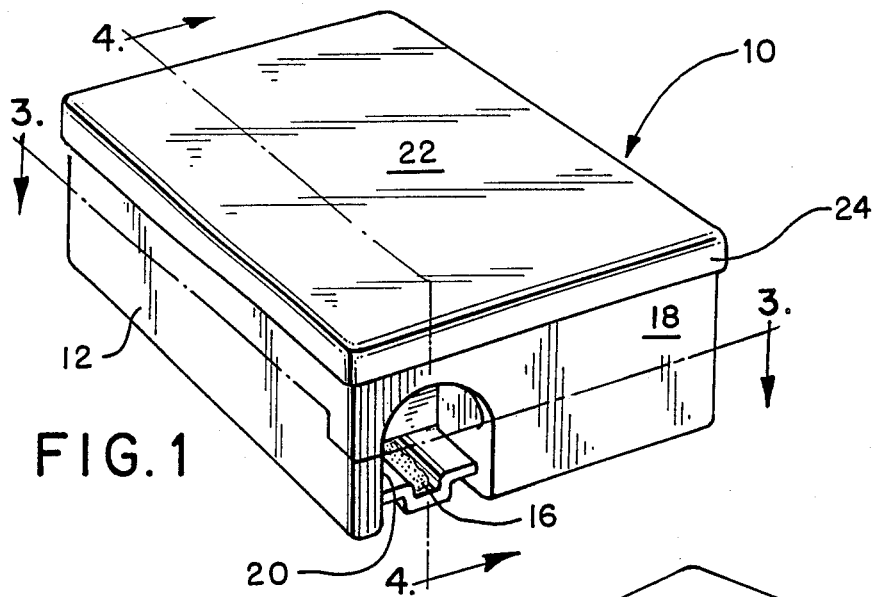
FIG. 1 is a perspective view of a presently preferred embodiment of the animal trap of this invention.
Figure 2:
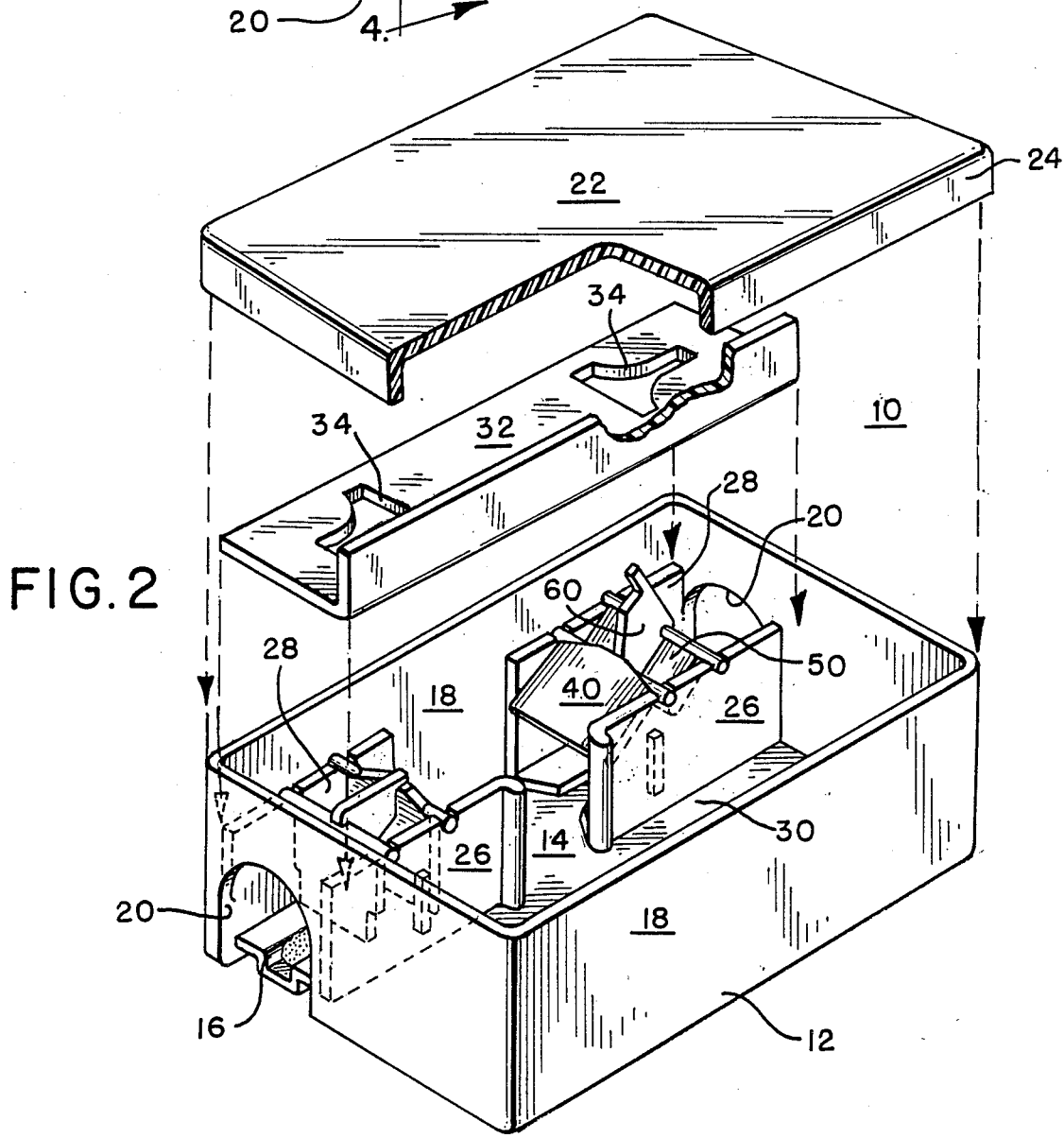
FIG. 2 is an exploded perspective view of the animal trap of FIG. 1.

Turning now to the drawings, FIGS. 1 and 2 provide overall views of an animal trap 10 that incorporates a presently preferred embodiment of this invention. The overall structure of this trap 10 includes a housing 12 that is made up of a bottom panel 14 that defines grooves 16 and a peripheral sidewall 18 that is secured to the perimeter of the bottom panel 14. As shown in FIG. 2, this peripheral sidewall 18 defines two entry ports 20 positioned on opposite sides of the sidewall 18.

The trap 10 also includes a top 22 which includes an integral skirt 24. The skirt 24 is sized to snap into place over the peripheral sidewall 18 to hold the top 22 releasably in position on the housing 12. The skirt 24 therefore functions as a means for releasably securing the top 22 to the housing 12.

As shown in FIG. 2, two partitions 26 are positioned within the housing 12, and they each define a respective entryway 28 between the partition 26 and the adjacent sidewall 18. The two entryways 28 communicate between the partitions 26 with a holding area 30 that acts as an imprisoning enclosure for trapped animals. The entryways 28 are closed upwardly by an interior wall 32 that defines a pair of openings 34 (best shown in FIG. 7).

The two entryways 28 and associated doors are identical, and the following discussion for simplicity will deal with only one. However, this discussion applies equally to the other.

Figure 8:
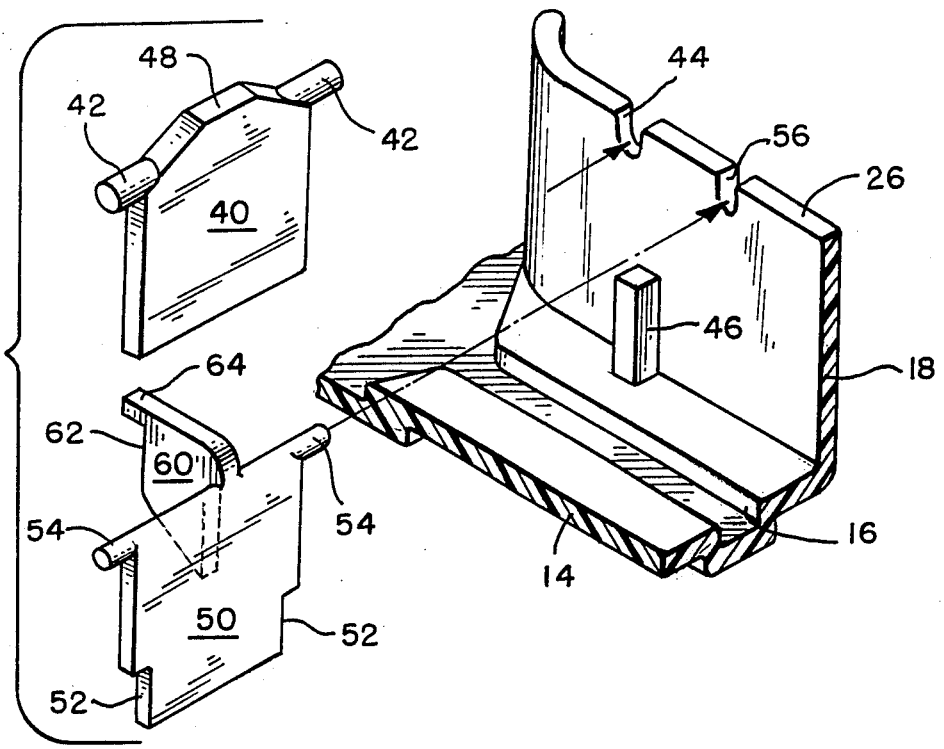
FIG. 8 is an exploded perspective view of an interior portion of the animal trap of FIG. 1 showing one set of inner and outer doors.

An inner door 40 and an outer door 50 are mounted in each of the entryways 28 to hinge freely about respective hinge axes. FIG. 8 provides details on one of the inner doors 40, and in this figure it can be seen that each of the inner doors 40 includes two integral hinge pins 42 which define a first hinge axis. In addition, each of the inner doors 40 includes an upper portion 48 that extends upwardly above the hinge pins 42. The hinge pins 42 are positioned in respective recesses 44 to mount the inner door 40 for pivotal movement. A pair of doorstops 46 are secured to the housing 12 adjacent to the inner door 40 to prevent the inner door 40 from moving outwardly. In FIG. 2 the inner door 40 on the left-hand side is shown in the closed position in which the inner door 40 is up against the doorstop 46 and the right-hand side shows the inner door 40 in the open position.

FIG. 8 also shows one of the outer doors 50. Each outer door 50 includes a pair of recesses 52 positioned to allow the outer door 50 to swing inwardly past the doorstops 46. Near the top of each outer door 50 are two integral hinge pins 54 which define a second hinge axis. These hinge pins 54 are mounted in respective recesses 56 that mount the outer door 50 for pivoting movement.

The outer door 50 supports a means for coupling the outer door 50 to the adjacent inner door 40. In this embodiment this coupling means comprises a latch 60 which is integrally formed with the outer door 50. The latch 60 defines an abutting edge 62 and a tongue 64. The openings 34 in the interior wall 32 are sized to receive the latch 60 as the outer door 50 pivots inwardly.

Figure 9A:
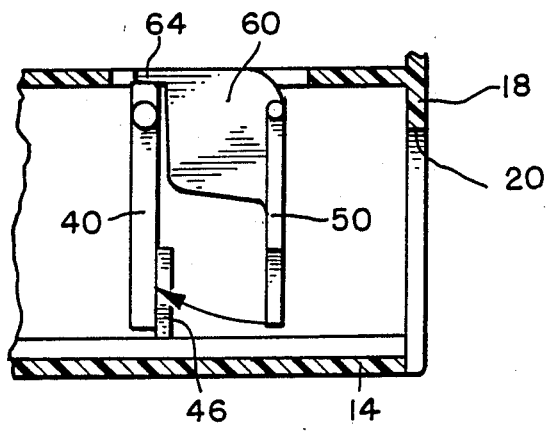
FIG. 9a is a sectional view taken along line 9a—9a of FIG. 3 showing the inner and outer doors in the closed position.

The operation of the doors 40, 50 and the coupling means or latch 60 will be described in conjunction with FIGS. 9a-9d. FIG. 9a shows the doors 40, 50 in the closed position. This is the position the doors naturally assume under the force of gravity. In the closed position of FIG. 9a the tongue 64 rests on the inner door 40 and prevents the outer door 50 from moving outwardly past the closed position. The doorstops 46 prevent the inner door 40 from moving outwardly.

Figure 9B:
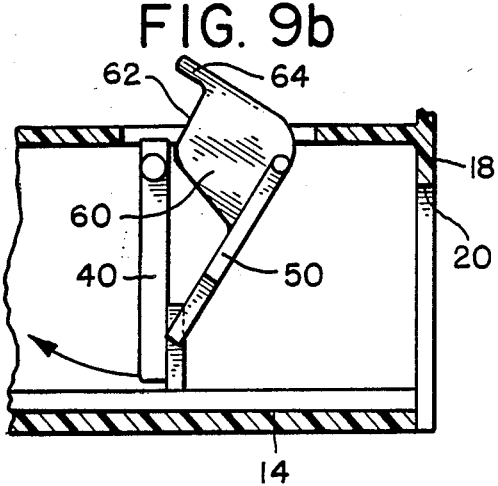
FIG. 9b is a view in the plane of FIG. 9a showing the disengaging of the coupling means as an animal entering the trap causes the outer door to inwardly rotate and contact the inner door.
Figure 9C:
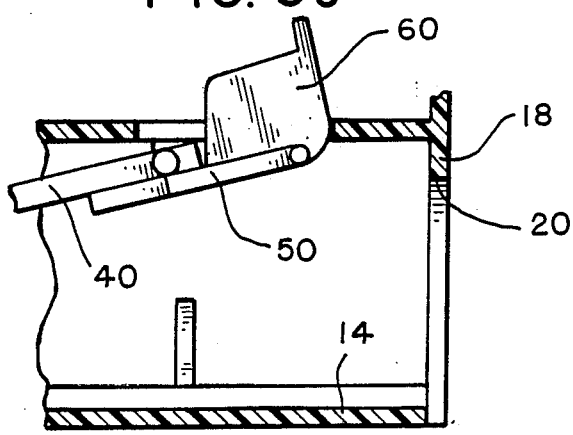
FIG. 9c is a view in the plane of FIG. 9a showing the inner door and the outer door in the open

FIGS. 9b and 9c show two stages in the movement of the doors 40, 50 from the closed to the open position. An animal (not shown) passing through the entry port 20 first contacts the outer door 50 and causes it to pivot or hinge inwardly. This disengages the abutting edge 62 from the inner door 40. Then the outer door 50 contacts the inner door 40 and the animal is allowed to pass through the entryway 28 to the holding area 30. As shown in FIGS. 9b and 9c the hinges for the doors 40, 50 are sufficiently close together that the outer door 50 contacts the inner door 40 as it moves inwardly. This ensures that there is no room between the two doors 40, 50 to allow an animal to become trapped.

Figure 9D:
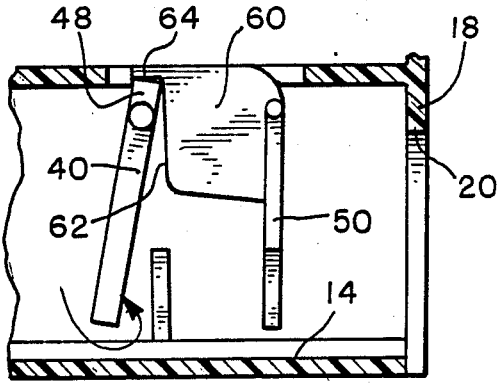
FIG. 9d is a view in the plane of FIG. 9a showing that the coupling means substantially prevents the inward rotation of the inner door when the outer door is in the closed position.

Once the animal leaves the entryway 28 for the holding area 30 the doors 40, 50 return to the closed position of FIG. 9a. In this position the tongue 64 prevents the outer door 50 from moving outwardly, and the abutting edge 62 prevents the inner 40 from moving inwardly. FIG. 9d shows the position of the doors 40, 50 when an animal tries to raise the inner door 40 in the direction of the arrow of FIG. 9d. Note that the upper portion 48 of the inner door 40 contacts the abutting edge 62 of the latch 60 and prevents the inner door 40 from moving past the position shown in FIG. 9d. In this way, the trapped animal is preventing from raising the inner door 40 and escaping from the trap. Once the animal has entered the holding area 30 the doors automatically are lowered by the force of gravity and are ready to receive another animal. Bait may be positioned in the grooves 16 without interfering with the free movement of the doors 50.

Of course, it should be understood that a wide range of materials, construction techniques and designs can be used to implement the present invention. For example, in the preferred embodiment the latch 60 is integrally molded in the outer door 50, as are the hinge pins 52.

The housing 12 including the bottom 14 and the peripheral sidewall 18 can be injection molded as a single part, and the interior wall 32 can be formed as an additional injection molded part which is secured in position by heat deformation of holding pins or adhesives.

Preferably, materials should be chosen to provide a trap 10 of suitable strength while using the lowest cost materials possible. It has been found that in many cases it is preferable to use a harder, more tamper-resistant material for the inner door 40 than the outer door 50. A suitable material for the inner door 40 is a glass filled polyester such as that sold by DuPont under the tradename RYNITE, and all of the remaining parts can be made from a lower cost material such as reground polycarbonate. In this way, the trapped animal is prevented from chewing or clawing his way through the inner door 40, without incurring the expense of this tamper-resistant material in other portions of the trap 10. Translucent materials may be preferred for many applications.

The preferred embodiment shown above includes two entry ports 20, each with its own set of doors 40, 50. Of course, alternate configurations can include any desired number of entry ports 20, each with its own set of doors 50. Also, this invention is not limited to traps having the precise hinging arrangements shown or the precise latches shown. Furthermore, other approaches the doorstop 46 and the tongue 64 can be used to ensure that the doors 40, 50 do not hinge outwardly. A variety of one-way doors are known in the art, and many of these can be adapted for use with the present invention.

The detailed description set out above has been provided for the purposes of illustration. It is not intended to be exhaustive or to limit the invention to the precise form disclosed. Rather, it is the following claims, including all equivalents, which are intended to define the scope of this invention.

I claim:

1. An animal trap comprising:
    a housing comprising a bottom, a peripheral sidewall, and a top which form an imprisoning enclosure to trap an animal;
    an entry port in the peripheral sidewall for providing access to the imprisoning enclosure;
    an animal-actuated, gravity-lowered inner door which is hingedly mounted inwardly from the entry port for rotation about a first hinge axis between an open and a closed position;
    an animal-actuated, gravity-lowered outer door which is hingedly mounted between the inner door and the entry port for rotation about a second hinge axis between an open and a closed position; and
    means for coupling the inner and outer doors to substantially prevent the inner door from opening in an inward direction when the outer door is in the closed position.

2. The invention of claim 1, wherein the outer door is hingedly mounted at a position suffi-ciently close to the inner door such that, when the outer door is inwardly rotated about the second hinge axis, the outer door contacts the inner door and causes the inner door to rotate inwardly about the first hinge axis.

3. The invention of claim 1, further comprising means for releasably securing the top to the peripheral sidewall.

4. The invention of claim 1, wherein the inner door is manufactured from a more tamper-resistant material than the outer door.

5. The invention of claim 4, wherein the inner door is manufactured from a composition comprising a glass filled polyester.

6. The invention of claim 1, further comprising a groove in the bottom of the trap which extends inwardly from the entry port, thereby providing a bait receptacle configured to receive bait such that bait placed in the groove does not interfere with rotation of the inner and outer doors.

7. The invention of claim 1, further comprising means for substantially preventing the inner door from rotating about the first hinge axis in an outward direction beyond the closed position of the inner door.

8. The invention of claim 7, wherein said preventing means comprises a doorstop securely positioned to abut the inner door when the inner door is in the closed position.

9. The invention of claim 8, wherein the outer door is configured to open and close without contacting the doorstop.

10. The invention of claim 1, wherein an upper portion of the inner door extends above the first hinge axis.

11. The invention of claim 1, further comprising means for substantially preventing the outer door from rotating about the second hinge axis in an outward direction beyond the closed position of the outer door.

12. The invention of claim 1, wherein the coupling means comprises a latch mounted to the outer door and positioned to engage the inner door when the outer door is in the closed position, thereby preventing inward rotation of the inner door.

13. The invention of claim 12, wherein the lath is configured to disengage from the inner door when the outer door rotates inwardly about the second hinge axis.

14. The invention of claim 1, wherein the coupling means comprises a latch mounted to the outer door and positioned to engage the inner door, said latch having a tongue and an abutting edge configured such that, when the outer door is in the closed position:

the tongue rests on a top marginal edge of the inner door, thereby substantially preventing the outer door and the latch mounted thereon from rotating about the second hinge axis in an outward direction beyond the closed position of the outer door, and the abutting edge contacts an outward side of the inner door when the inner door rotates inwardly from the closed position, thereby substantially preventing the inner door from inwardly rotating about the first hinge axis.

15. The invention of claim 14, wherein the latch is configured to disengage from the inner door when the outer door inwardly rotates about the second hinge axis.

16. The invention of claim 1, wherein the housing further comprises an interior partition which extends partially across the imprisoning enclosure to divide the enclosure into an entryway and a holding area, and wherein the inner and outer doors are mounted in the entryway.

17. An animal trap comprising:

a housing comprising a bottom, a peripheral sidewall, and a top which form an imprisoning enclosure to trap an animal;

an entry port in the peripheral sidewall for providing access to the imprisoning enclosure;

an animal-actuated, gravity-lowered inner door which is hingedly mounted inwardly from the entry port for rotation about a first hinge axis between an open and a closed position;

an animal-actuated, gravity-lowered outer door which is hingedly mounted between the inner door and the entry port for rotation about a second hinge axis between an open and a closed position; and a latch mounted to the outer door and positioned to engage the inner door when the outer door is in the closed position, thereby preventing the inward rotation of the inner door.

18. The invention of claim 17, wherein the outer door is hingedly mounted at a position sufficiently close to the inner door such that, when the outer door is inwardly rotated about the second hinge axis, the outer door contacts the inner door and causes the inner door to rotate inwardly about the first hinge axis.

19. The invention of claim 17, further comprising means for releasably securing the top to the peripheral sidewall.

20. The invention of claim 17, further comprising means for substantially preventing the inner door from rotating about the first hinge axis in an outward direction beyond the closed position of the inner door.

21. The invention of claim 20, wherein said preventing means comprises a doorstop securely positioned to abut the inner door when the inner door is in the closed position.

22. The invention of claim 21, wherein the outer door is configured to open and close without contacting the doorstop.

23. The invention of claim 17, further comprising means for substantially preventing the outer door from rotating about the second hinge axis in an outward direction beyond the closed position of the outer door.

24. The invention of claim 17, wherein the latch is configured to disengage from the inner door when the outer door rotates inwardly about the second hinge axis.

25. The invention of claim 17, wherein the latch is mounted to the outer door and positioned to engage the inner door, said latch having a tongue and an abutting edge configured such that, when the outer door is in the closed position:

the tongue rests on a top marginal edge of the inner door, thereby substantially preventing the outer door and the latch mounted thereon from rotating about the second hinge axis in an outward direction beyond the closed position of the outer door, and the abutting edge contacts an outward side of the inner door when the inner door rotates inwardly from the closed position, thereby substantially prevent the inner door from inwardly rotating about the first hinge axis.

26. The invention of claim 25, wherein the latch is configured to disengage from the inner door when the outer door inwardly rotates about the second hinge axis.

* * * * *

UNITED STATES PATENT AND TRADEMARK OFFICE
CERTIFICATE OF CORRECTION

PATENT NO. : 4,887,381

DATED : December 19, 1989

INVENTOR(S) : James B. Tieben

It is certified that error appears in the above-identified patent and that said Letters Patent is hereby corrected as shown below:

In column 2, line 24, after "open" please insert --position--.

In column 3, line 63, please delete "50" and substitute therefor --40--.

In column 4, line 25, please delete "50" and substitute therefor --40--.

In column 4, line 28, before the first occurrence of "the" please insert --to--.

IN THE CLAIMS

In claim 2, column 4, line 61, please delete "suffi-ciently" and substitute therefor --sufficiently--.

In claim 13, column 5, line 36, please delete "lath" and substitute therefor --latch--.

UNITED STATES PATENT AND TRADEMARK OFFICE
CERTIFICATE OF CORRECTION

PATENT NO. : 4,887,381

DATED : December 19, 1989

INVENTOR(S) : James B. Tieben

It is certified that error appears in the above-identified patent and that said Letters Patent is hereby corrected as shown below:

In claim 25, column 6, lines 58 and 59, please delete "prevent" and substitute therefor --preventing--.

Signed and Sealed this

Twenty-third Day of June, 1992

Attest:

DOUGLAS B. COMER

*Attesting Officer*    Acting Commissioner of Patents and Trademarks